US011525979B2

(12) United States Patent
Liu et al.

(10) Patent No.: US 11,525,979 B2
(45) Date of Patent: Dec. 13, 2022

(54) FOCUS-ADJUSTMENT APPARATUS

(71) Applicant: Nanning FuLian FuGui Precision Industrial Co., Ltd., Nanning (CN)

(72) Inventors: Chan-Shen Liu, New Taipei (TW); Heng-Peng Liu, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 75 days.

(21) Appl. No.: 17/333,264

(22) Filed: May 28, 2021

(65) Prior Publication Data
US 2022/0326475 A1 Oct. 13, 2022

(30) Foreign Application Priority Data
Apr. 8, 2021 (CN) .......................... 202110379745.3

(51) Int. Cl.
| | |
|---|---|
| *G02B 7/10* | (2021.01) |
| *G03B 3/10* | (2021.01) |
| *G02B 7/00* | (2021.01) |
| *G02B 7/02* | (2021.01) |

(52) U.S. Cl.
CPC .............. *G02B 7/10* (2013.01); *G02B 7/005* (2013.01); *G02B 7/022* (2013.01); *G03B 3/10* (2013.01)

(58) Field of Classification Search
CPC .......... G02B 7/10; G02B 7/005; G02B 7/022; G03B 3/10
See application file for complete search history.

(56) References Cited

U.S. PATENT DOCUMENTS

| | | | |
|---|---|---|---|
| 6,762,888 B1 * | 7/2004 | Oshima | ........... G02B 7/102 |
| | | | 359/823 |
| 6,961,090 B2 | 11/2005 | Oshima | |
| 2002/0191098 A1 * | 12/2002 | Oshima | ......... H04N 5/23212 |
| | | | 348/E5.045 |

FOREIGN PATENT DOCUMENTS

| | | |
|---|---|---|
| CN | 104765123 A | 7/2015 |
| TW | 201015107 A | 4/2010 |
| TW | I438482 B | 5/2014 |
| WO | 2018105200 A1 | 6/2018 |

* cited by examiner

Primary Examiner — James C. Jones
(74) Attorney, Agent, or Firm — ScienBiziP, P.C.

(57) ABSTRACT

A focus-adjustment apparatus which can be applied during manufacture of camera modules includes a rotation mechanism, a drive mechanism, an elevating mechanism, an optoelectronic chip, and a lens module. The rotation mechanism includes a container and movable latch rods therein. The drive mechanism can rotate the rotation mechanism, and the elevating mechanism with optoelectronic chip attached is under the rotation mechanism. The lens module includes a support element adjacent to the optoelectronic chip, an adjustment structure rotatably disposed on the support element, and a lens above the optoelectronic chip in the adjustment structure. When the elevating mechanism raises the lens module and the drive mechanism rotates the rotation mechanism, at least one of the latch rods rotates the adjustment structure, so as to change the distance between the lens and the optoelectronic chip and achieve correct focus.

10 Claims, 6 Drawing Sheets

FOCUS-ADJUSTMENT APPARATUS

FIELD

The subject matter herein generally relates to focus-adjustment apparatuses for camera module.

BACKGROUND

Before a camera module is assembled into a product, focus-adjustment apparatuses are used to adjust focus of the camera module in order to enable camera modules to capture focused images.

However, camera modules with different focal lengths have lens modules of different sizes. When adjusting the focus of camera modules, it is necessary to provide different focus-adjustment apparatuses for lens modules of different sizes. Therefore, the manufacturing cost and the complexity of the manufacture process of camera modules are increased. Therefore, it would be desirable to provide a solution for improving the focus-adjustment apparatus.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
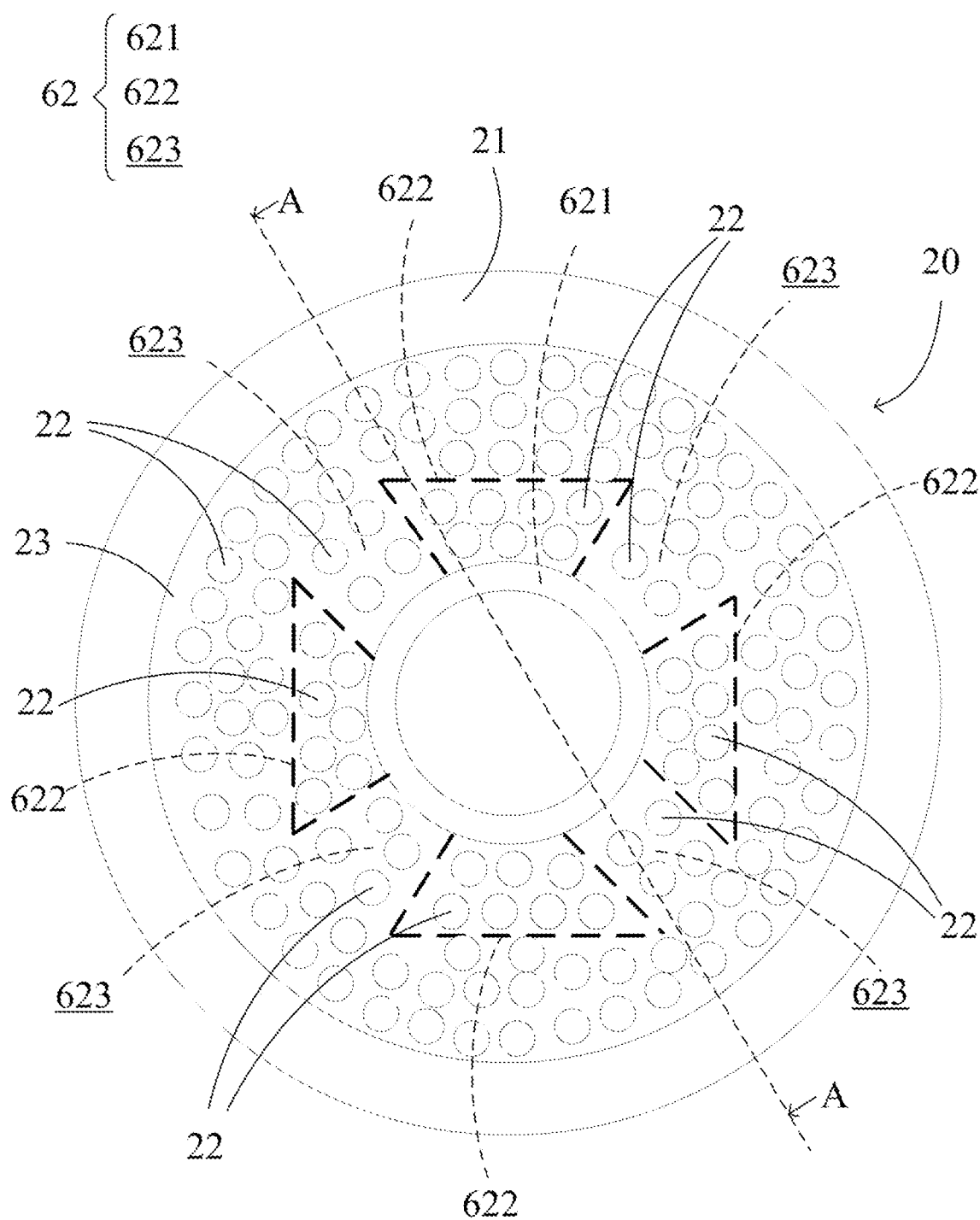
FIG. 1 is a top view of a rotation mechanism for a camera module in an embodiment according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connected" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
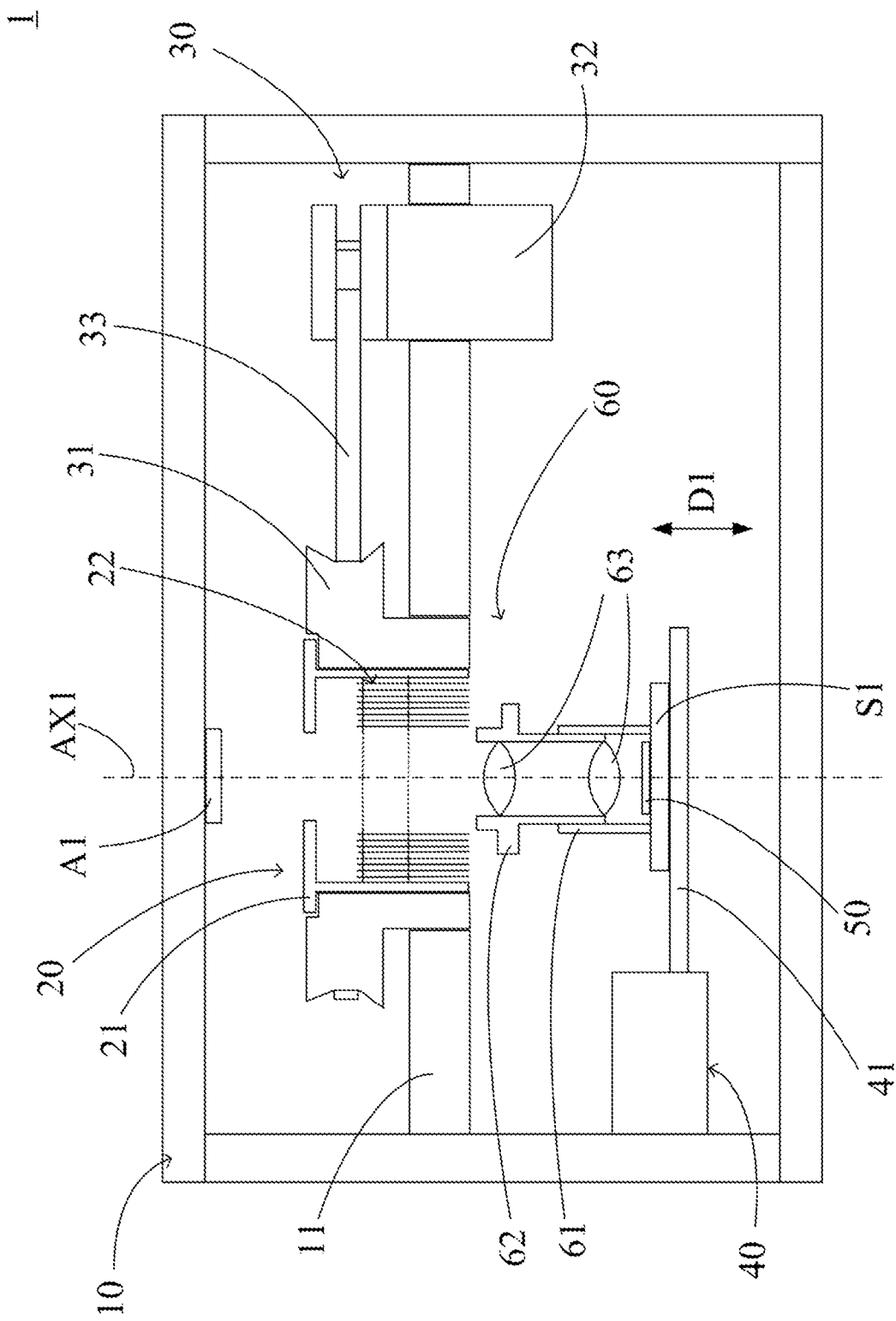
FIG. 2 is a schematic view of a focus-adjustment apparatus in an embodiment of the present disclosure, in a starting position.
Figure 3:
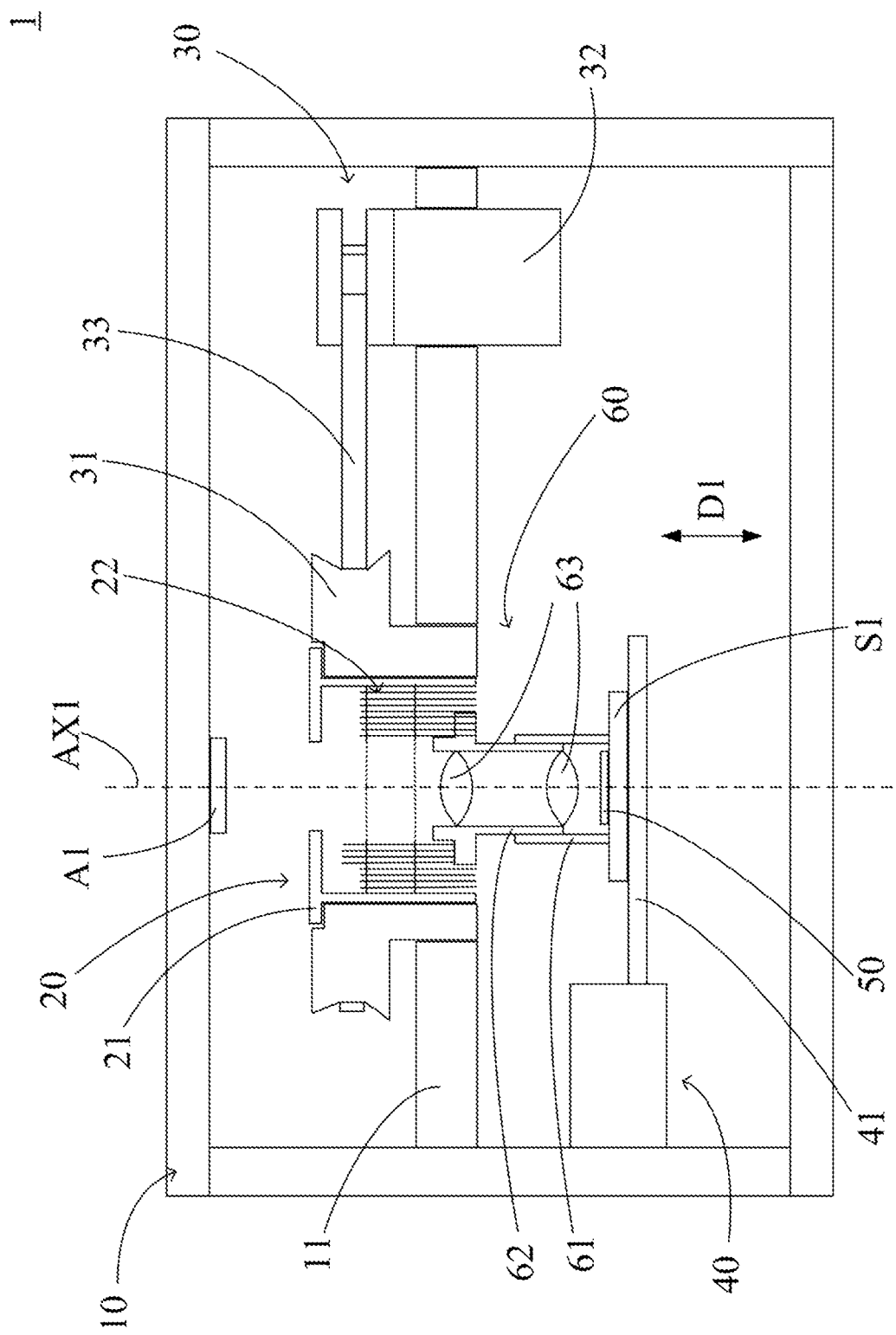
FIG. 3 is a schematic view of the focus-adjustment apparatus of FIG. 2, wherein the lens module is in a partly adjusted position.
Figure 4:
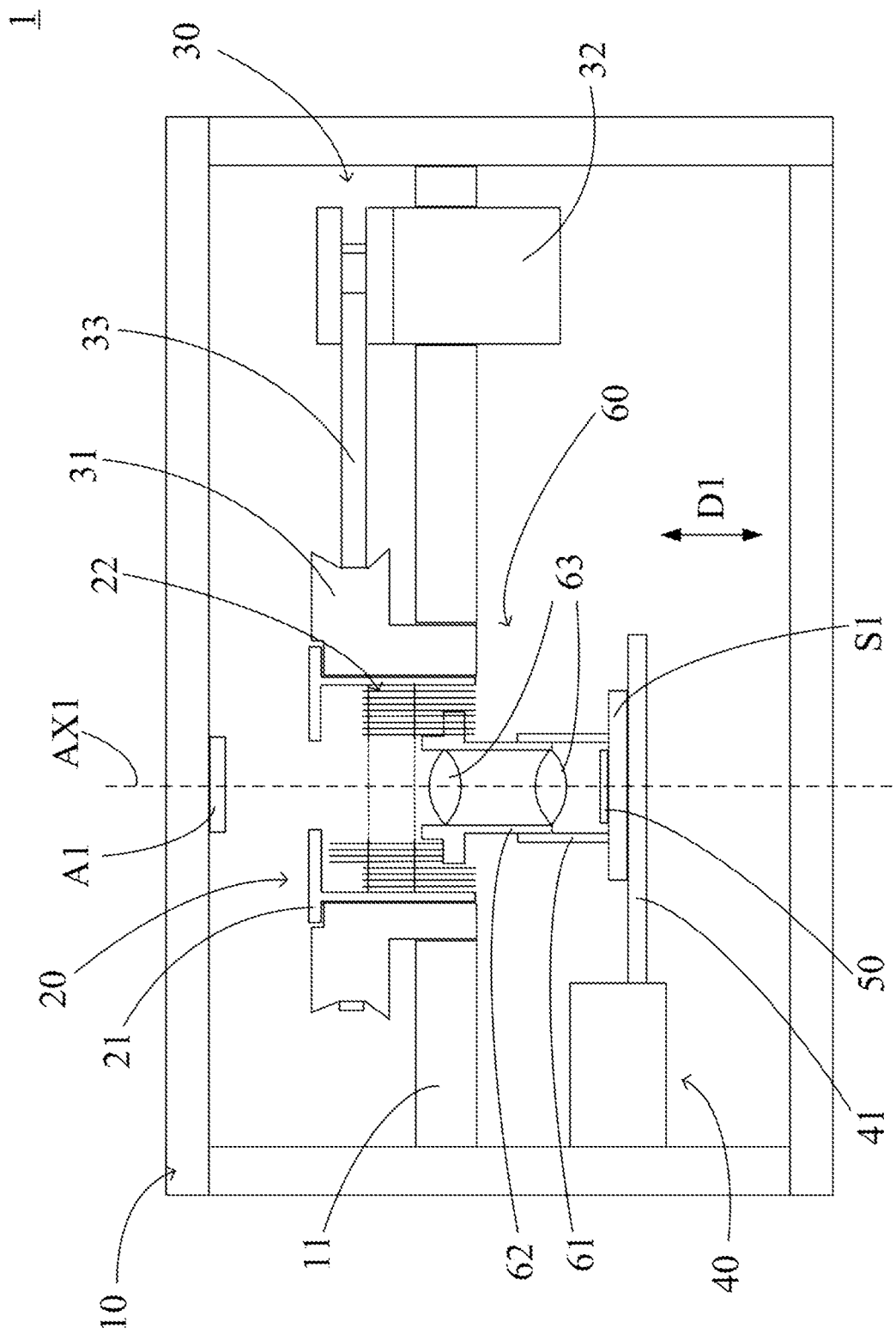
FIG. 4 is a schematic view of the focus-adjustment apparatus of FIG. 2, wherein the lens is further adjusted relative to FIG. 3.

FIG. 1 is a top view of a rotation mechanism 20 in an embodiment of the present disclosure. In the embodiment, the latch rods 22 arranged in the container 21 can adjust the focus of the lens module. FIGS. 2 to 4 show focus-adjustment apparatus 1 in an embodiment of the present disclosure. In FIG. 2, the lens module 60 is in a starting position. In FIG. 3 and FIG. 4, the lens module 60 has been partly and further adjusted. The focus-adjustment apparatus 1 includes a chassis 10, a rotation mechanism 20, a drive mechanism 30, an elevating mechanism 40, an optoelectronic chip 50, and a lens module 60. In the embodiment, the lens module 60 is a single-axis (Z-axis) lens module. The focus-adjustment apparatus 1 can adjust the focus of the single-axis (Z-axis) lens module 60. The chassis 10 includes a carrier 11, configured to carry the drive mechanism 30. The rotation mechanism 20 is in the chassis 10, and disposed on the drive mechanism 30. The rotation mechanism 20 is configured to adjust the lens module 60. The rotation mechanism 20 includes a container 21 and latch rods 22. The latch rods 22 extend and retract in a movement direction D1 (see FIG. 2, "movement direction D1" can include an extension direction and an opposite retraction movement), and are movably arranged in the container 21.

The drive mechanism 30 is in the chassis 10, and disposed on the carrier 11. The drive mechanism 30 is configured to rotate the rotation mechanism 20. In the embodiment, the drive mechanism 30 includes a drive base 31, a motor 32, and a drive belt 33. The drive base 31 is rotatably disposed on the carrier 11, and the container 21 is in the drive base 31. The motor 32 can be affixed to the carrier 11. The drive belt 33 is connected to the drive base 31 and the motor 32. Via the drive belt 33, the motor 32 drives the drive mechanism 30 to rotate. In another embodiment, the drive belt 33 can be replaced by at least one gear driven by the motor 32.

In the embodiment, when the container 21 is put in the drive base 31, the container 21 is detachably retained in the drive base 31, so as to facilitate replacement. Moreover, when the drive base 31 is rotated, the drive base 31 drives the container 21 to rotate. In the embodiment, the drive base 31 and the container 21 are rotated about a central axis AX1, and the central axis AX1 extends in movement direction D1. Moreover, in the embodiment, the central axis AX1 corresponds to the Z axis of the lens module 60.

The elevating mechanism 40 is disposed in the chassis 10, under the rotation mechanism 20 and the carrier 11. In the embodiment, the elevating mechanism 40 includes an elevating base 41. The substrate S1 and the optoelectronic chip 50 are on the elevating base 41 of the elevating mechanism 40. In the embodiment, the substrate S1 is a circuit board. The optoelectronic chip 50 can be an image sensor, disposed on the substrate S1, and electrically connected to the substrate S1. In the embodiment, the substrate S1 is detachably retained on the elevating base 41 of the elevating mechanism 40. The lens module 60 is disposed on the substrate S1. The lens module 60 can be affixed to the substrate S1. The substrate S1, the optoelectronic chip 50, and the lens module 60 form a camera module.

As shown in FIG. 3, when the elevating mechanism 40 raises the lens module 60 and the optoelectronic chip 50 to an adjustment position, the lens module 60 pushes some of the latch rods 22 in the movement direction D1. As shown in FIG. 4, when the lens module 60 is in the adjustment position, the drive mechanism 30 rotates the rotation mechanism 20, and thus the lens module 60 is adjusted by the rotation of the latch rods 22 around the central axis AX1. When the focus of the lens module 60 relative to the optoelectronic chip 50 is adjusted, the substrate S1, the lens module 60, and the optoelectronic chip 50 can be removed from the focus-adjustment apparatus 1.

Figure 5:
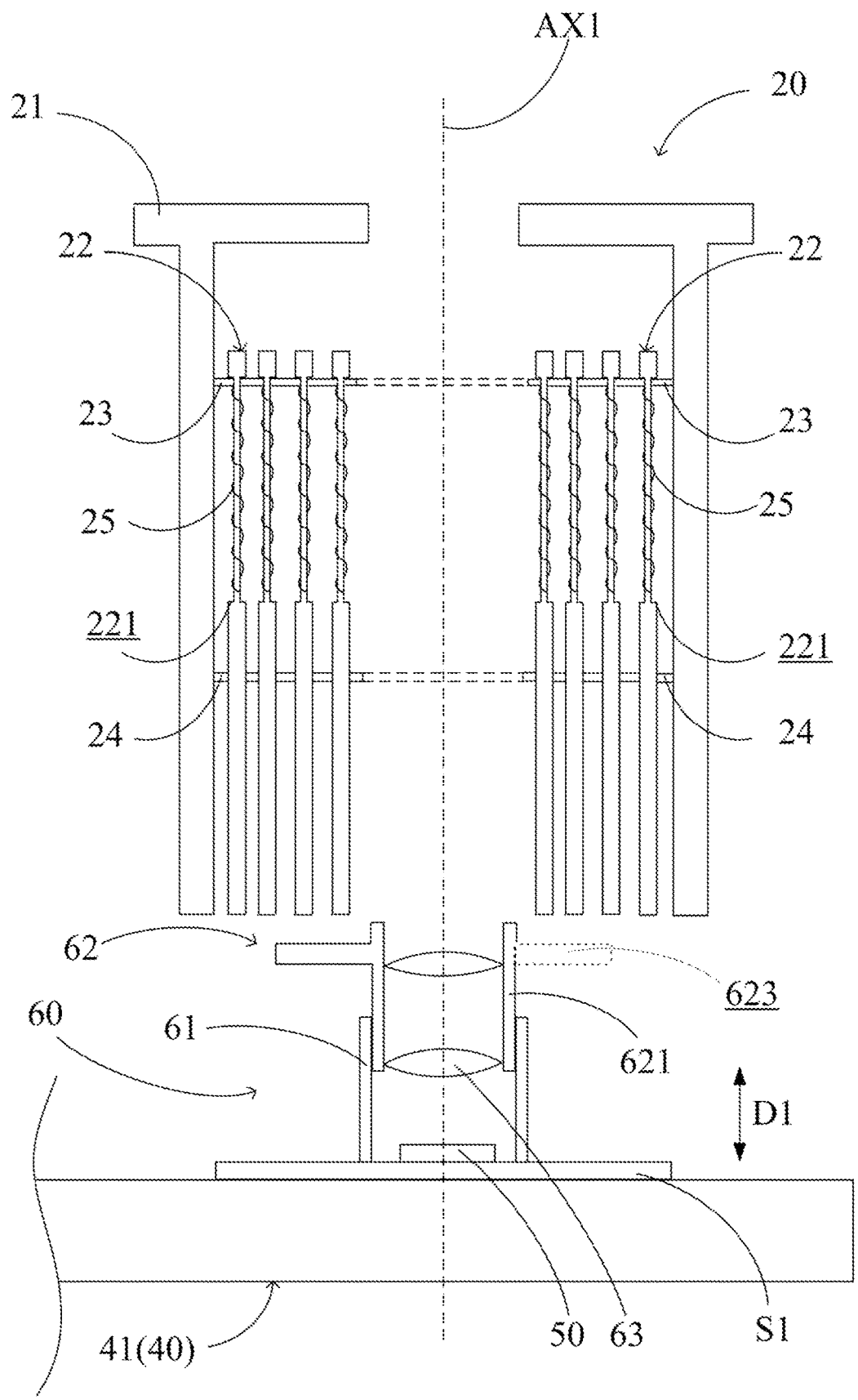
FIG. 5 is a schematic diagram of the rotation mechanism with reference to line AA of FIG. 1, wherein the lens module is in the starting position.
Figure 6:
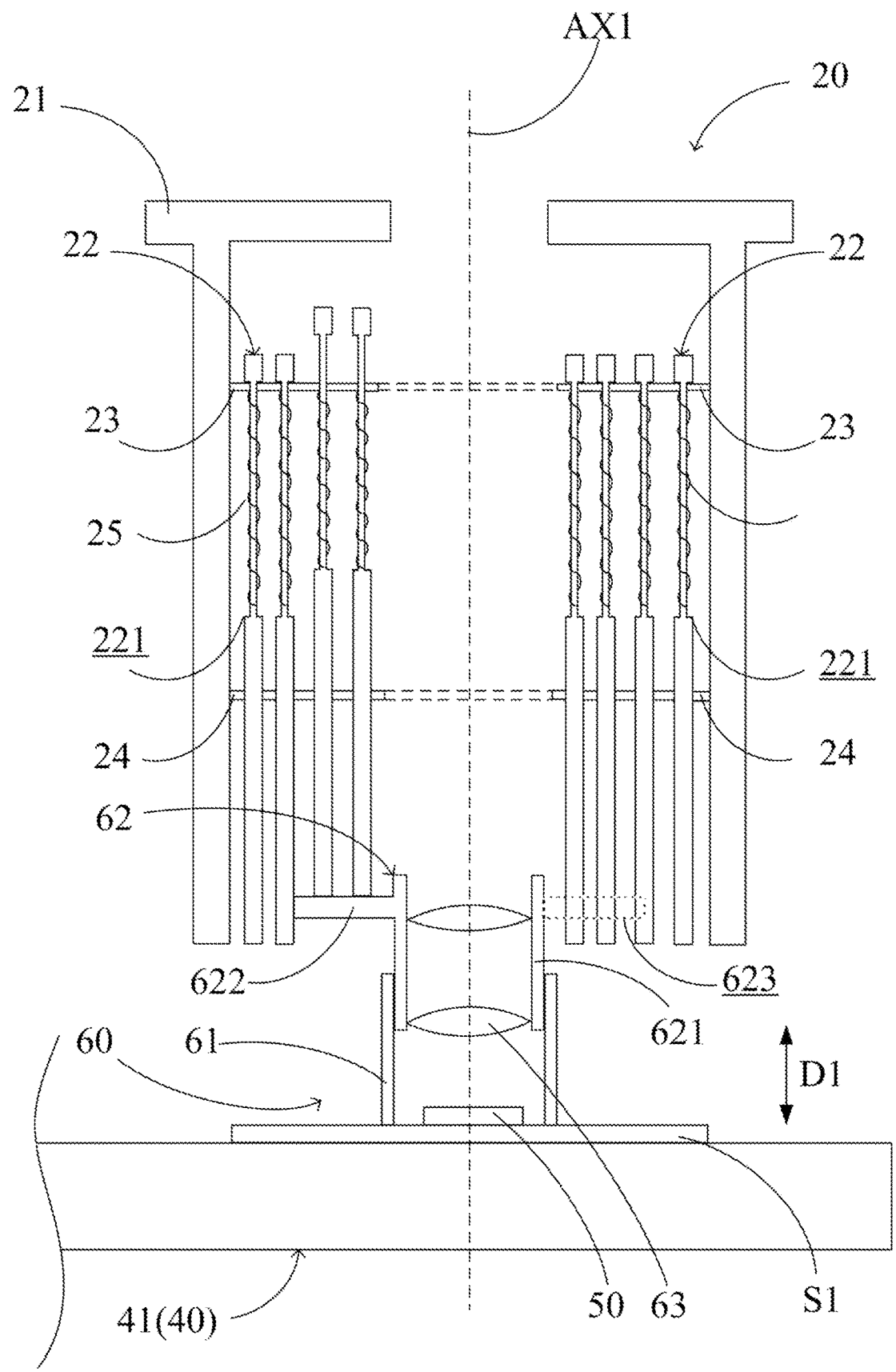
FIG. 6 is a schematic diagram of the rotation mechanism, partly adjusted with reference to line AA of FIG. 1.

FIG. 5 is a schematic diagram of the rotation mechanism 20, the line AA of FIG. 1 shows the lens module 60 in a starting position. FIG. 6 is a schematic diagram of the rotation mechanism 20 wherein the lens module 60 is adjusted. The lens module 60 includes a support element 61, an adjustment structure 62, and one or more lenses 63. The support element 61 is disposed on the substrate S1, and adjacent to the optoelectronic chip 50. The adjustment structure 62 can be rotatably disposed on the support element 61. The lenses 63 are disposed in the adjustment structure 62, over the optoelectronic chip 50. The lenses 63 are arranged along the central axis AX1, and extend perpendicular to the central axis AX1. In the embodiment, the lens module 60 includes two lenses 63, but the number of the lens 63 is not limited thereto. For example, the lens module 60 may include one or three or more lenses 63.

In the embodiment, the support element 61 is affixed to the substrate S1, and the optoelectronic chip 50 is affixed to the substrate S1. In other words, when the adjustment structure 62 is rotated, the support element 61 is not rotated or moved relative to the optoelectronic chip 50. The support element 61 and the adjustment structure 62 are cylindrical structures. The optoelectronic chip 50 is in the support element 61, and the lenses 63 are affixed to the inside of the adjustment structure 62. Moreover, the support element 61 and the adjustment structure 62 surround the central axis AX1. The central axis AX1 extends through the centers of the support element 61, the adjustment structure 62, and the lenses 63. The support element 61 and the adjustment structure 62 have screw threads, and the adjustment structure 62 is screwed to the support element 61. Therefore, when the adjustment structure 62 is rotated relative to the support element 61, the lenses 63 are moved in or out relative to the optoelectronic chip 50.

The rotation mechanism 20 further includes an upper positioning plate 23, a lower positioning plate 24, and springs 25. The upper positioning plate 23 and the lower positioning plate 24 are disposed in the container 21, and the lower positioning plate 24 is separated from the upper positioning plate 23. The upper positioning plate 23 and the lower positioning plate 24 are perpendicular to the central axis AX1. In the embodiment, the upper positioning plate 23 and the lower positioning plate 24 are ring-like structures. The upper positioning plate 23 and the lower positioning plate 24 surround the central axis AX1, are separated from the central axis AX1. The latch rods 22 extend through the upper positioning plate 23 and the lower positioning plate 24. The upper positioning plate 23 and the lower positioning plate 24 restrict the movement of the latch rods 22 in the movement direction D1.

Each latch rod 22 is connected to a spring 25. In other words, each spring 25 is disposed on one latch rod 22. The springs 25 are between the upper positioning plate 23 and the lower positioning plate 24. In the embodiment, each latch rod 22 includes a positioning groove 221. Each spring 25 is in one positioning groove 221. Moreover, the upper positioning plate 23 is in the positioning grooves 221, so as to restrict the movement distance of the latch rods 22 in the movement direction D1. One end of the spring 25 abuts the bottom of the positioning groove 221, and the other end of the spring 25 abuts the upper positioning plate 23. Therefore, before the latch rods 22 are moved by the adjustment structure 62, the latch rods 22 are maintained in an initial position by the springs 25.

In the embodiment, the latch rods 22 are arranged as an array in the container 21, and are parallel to each other. The latch rods 22 have the same structure and size, such as the length of the latch rods 22 are the same, so as to reduce manufacture costs. The number of the latch rods 22 is not limited. For example, the rotation mechanism 20 includes at least 20 or t 30 latch rods 22.

As shown in FIG. 1 and FIG. 5, the adjustment structure 62 includes a cylinder 621, blocking elements 622, and retaining grooves 623. The blocking elements 622 are connected to the outer side wall of the cylinder 621, and extend radially from the central axis AX1 as the center. The lenses 63 are affixed to the inner side wall of the cylinder 621. Each retaining groove 623 is between two adjacent blocking elements 622. The blocking elements 622 and the retaining grooves 623 are alternately arranged along a circular path. In the embodiment, the adjustment structure 62 has four blocking elements 622, but the number of the blocking elements 622 is not limited thereto. For example, adjustment structure 62 includes at least two or three blocking elements 622.

In the embodiment, the maximum diameter of the adjustment structure 62 in a direction perpendicular to the movement direction D1 is less than the inner diameter of the container 21 in a direction perpendicular to the movement direction D1. In other words, as long as the adjustment structure 62 can be placed inside the container 21, lens modules 60 of different sizes can use the focus-adjustment apparatus 1 to perform the focusing step. Moreover, in some embodiments, the diameter of the latch rods 22 is less than at least 2 times the maximum distance between two adjacent blocking elements 622, so that the retaining groove 623 can accommodate more latch rods 22. The focus-adjustment apparatus 1 can be more accurately adjusted for camera modules of different sizes with a greater number of latch rods 22.

As shown in FIG. 2 and FIG. 5, when the focus of the camera module (the substrate S1, the optoelectronic chip 50 and the lens module 60) is to be adjusted, the camera module can be placed on the elevating mechanism 40. Moreover, a standard object for imaging (standard image component A1) is disposed over the rotation mechanism 20, and a test image is shown on the lower surface of the standard image component A1. In the embodiment, the standard image component A1 is connected to the chassis 10. As shown in FIG. 2 and FIG. 5, when the elevating mechanism 40 is in a starting position, the camera module is separated from the rotation mechanism 20, and the camera module is under the rotation mechanism 20. Moreover, the bottoms of the latch rods 22 are aligned on a flat surface, so as to be perpendicular to the movement direction D1.

As shown in FIGS. 1, 3, and 6, the elevating mechanism 40 can then move the camera module in the movement direction D1. When the elevating mechanism 40 raises the lens module 60 to an adjusted position, the blocking elements 622 push the latch rods 22 in the movement direction D1. When the elevating mechanism 40 raises the lens module 60 to the adjustment position, some of the latch rods 22 are in the retaining grooves 623, and some of the latch rods 22 abut the blocking elements 622. In the embodiment, when the lens module 60 is in an adjusted position, each retaining groove 623 accommodates at least one latch rod 22. In some embodiments, each retaining groove 623 accommodates at least two or three latch rods 22.

When the lens module 60 is in an adjusted position, the motor 32 drives the container 21 in forward or reverse rotation by the drive base 31. When the container 21 rotates, the container 21 drives the latch rods 22 to move along a circular path, and the latch rods 22 in the retaining grooves 623 push the adjustment structure 62 to rotate about the central axis AX1. The adjustment structure 62 is screwed to the support element 61, and the lenses 63 are affixed to the adjustment structure 62. Therefore, when the adjustment structure 62 rotates relative to the support element 61, the adjustment structure 62 and the lenses 63 move relative to the optoelectronic chip 50 in the movement direction D1, which changes the distance between the lens 63 and the optoelectronic chip 50.

In the embodiment, when the lenses 63 are moved in the movement direction D1, the optoelectronic chip 50 continuously detects and analyzes the test image on the standard image component A1 and generates signals. The signals are transmitted to a processing device. The processing device can determine whether the distance between the lens 63 and optoelectronic chip 50 is an appropriate focusing distance according to the signals. The processing device determining that the distance between the lens 63 and the optoelectronic chip 50 is not appropriate signifies that the lenses 63 are not correctly focused on the optoelectronic chip 50, resulting in unfocussed images produced by the camera module.

If the processing device determines that the distance between the lens 63 and the optoelectronic chip 50 is appropriate, it means that the lenses 63 are correctly focused on the optoelectronic chip 50, so that the image produced by the camera module is clearer. At this time, the focus-adjustment apparatus 1 has completed the focusing process of the camera module, and the motor 32 stops driving the drive mechanism 30.

The camera module which has been processed for correct focus can be fixed by applying adhesive to the adjustment structure 62 and the support element 61, to affix the adjustment structure 62 to the support element 61. In other words, the adhesive is used to restrict the rotation and the movement of the adjustment structure 62 relative to the support element 61.

The focus-adjustment apparatus 1 uses the latch rods 22 of the rotation mechanism 20 to rotate the adjustment structure 62. The focus-adjustment apparatus 1 can adjust the focus between the lens module 60 and the optoelectronic chip 50, when the diameter of the adjustment structure 62 of the lens module 60 is smaller than the diameter of the container 21. In other words, the focus-adjustment apparatus 1 can adjust the focus of camera modules which have different sizes, thereby reducing the production cost and the complexity of the production process of the camera module.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A focus-adjustment apparatus comprising:
  a rotation mechanism comprising:
    a container; and
    a plurality of latch rods movably arranged in the container;
  a drive mechanism configured to rotate the rotation mechanism;
  an elevating mechanism underneath the rotation mechanism;
  an optoelectronic chip on the elevating mechanism; and
  a lens module comprising:
    a support element adjacent to the optoelectronic chip;
    an adjustment structure rotatably disposed on the support element; and
    a lens disposed in the adjustment structure, and over the optoelectronic chip;
  wherein when the elevating mechanism raises the lens module to an adjustment position, and the drive mechanism rotates the rotation mechanism, at least one of the latch rods drives the adjustment structure to rotate, so as to change a distance between the lens and the optoelectronic chip.

2. The focus-adjustment apparatus as claimed in claim 1, wherein the rotation mechanism further comprises:
  an upper positioning plate disposed in the container; and
  a lower positioning plate disposed in the container, and separated from the upper positioning plate;
  wherein the latch rods extend through the upper positioning plate and the lower positioning plate, the upper positioning plate and the lower positioning plate are configured to restrict a movement of the latch rod in a movement direction.

3. The focus-adjustment apparatus as claimed in claim 2, wherein the rotation mechanism further comprises a plurality of springs disposed on the latch rods, and the springs are between the upper positioning plate and the lower positioning plate.

4. The focus-adjustment apparatus as claimed in claim 3, wherein each of the latch rods comprises a positioning groove, and each of the springs is in one of the positioning grooves.

5. The focus-adjustment apparatus as claimed in claim 1, wherein the latch rods are arranged in the container in an array parallel to each others, and the length of each of the latch rods is the same.

6. The focus-adjustment apparatus as claimed in claim 1, wherein the drive mechanism further comprises:
  a drive base, wherein the container is in the drive base; and
  a motor configured to drive the drive base to rotate.

7. The focus-adjustment apparatus as claimed in claim 1, wherein the support element and the adjustment structure are cylindrical structures, and the adjustment structure is screwed to the support element, and wherein when the adjustment structure is rotated to the support element, the lens is moved relative to the optoelectronic chip.

8. The focus-adjustment apparatus as claimed in claim 1, wherein the adjustment structure comprises a plurality of blocking elements and a plurality of retaining grooves, the blocking elements and the retaining grooves are alternately arranged along a circular path, and wherein when the elevating mechanism raises the lens module to the adjustment position, some of the latch rods in the retaining grooves, and some of the latch rods abut to the blocking elements.

9. The focus-adjustment apparatus as claimed in claim 8, wherein as the elevating mechanism raises the lens module to the adjustment position, the blocking elements pushes some of the latch rods to be moved in a movement direction.

10. The focus-adjustment apparatus as claimed in claim 1, wherein when the elevating mechanism is in a starting position, bottoms of the latch rods are aligned with a flat surface.

\* \* \* \* \*